(12) United States Patent
Ribi

(10) Patent No.: US 8,402,832 B2
(45) Date of Patent: Mar. 26, 2013

(54) PHYSICAL/CHEMICAL UNIFORM PRESSURE INDICATING CONSTRUCTS INCLUDING CHEMISTRIES, FILMS AND DEVICES CONFIGURATIONS

(75) Inventor: Hans Oliver Ribi, Hillsborough, CA (US)

(73) Assignee: Volk Enterprises, Inc., Alpharetta, GA (US)

( * ) Notice: Subject to any disclaimer, the term of this patent is extended or adjusted under 35 U.S.C. 154(b) by 477 days.

(21) Appl. No.: 12/530,893

(22) PCT Filed: Mar. 12, 2008

(86) PCT No.: PCT/US2008/056727
§ 371 (c)(1), (2), (4) Date: Jun. 16, 2010

(87) PCT Pub. No.: WO2008/112811
PCT Pub. Date: Sep. 18, 2008

(65) Prior Publication Data
US 2010/0326198 A1    Dec. 30, 2010

Related U.S. Application Data

(60) Provisional application No. 60/894,403, filed on Mar. 12, 2007.

(51) Int. Cl.
*G01L 7/00* (2006.01)
(52) U.S. Cl. .......................................................... 73/700
(58) Field of Classification Search .................... 73/700, 73/715
See application file for complete search history.

(56) References Cited

U.S. PATENT DOCUMENTS

| | | | | |
|---|---|---|---|---|
| 4,426,881 A | * | 1/1984 | Magoulick | 73/146.8 |
| 5,189,979 A | * | 3/1993 | Popenoe | 116/273 |
| 6,817,311 B1 | * | 11/2004 | Treen et al. | 116/270 |
| 6,892,583 B2 | * | 5/2005 | Baek | 73/715 |
| 7,110,164 B2 | * | 9/2006 | Paolini et al. | 359/296 |
| 7,181,052 B2 | * | 2/2007 | Fujieda | 382/124 |
| 7,649,469 B2 | * | 1/2010 | Smith et al. | 340/665 |
| 2003/0079547 A1 | * | 5/2003 | Baek | 73/716 |
| 2007/0197383 A1 | * | 8/2007 | Koene et al. | 503/201 |
| 2010/0008552 A1 | * | 1/2010 | Shin et al. | 382/124 |
| 2010/0236682 A1 | * | 9/2010 | Patient et al. | 152/450 |

* cited by examiner

*Primary Examiner* — Freddie Kirkland, III
(74) *Attorney, Agent, or Firm* — Laurence P. Colton; Smith Risley Tempel Santos LLC

(57) ABSTRACT

Pressure measurement and recording mediums and devices that can respond accurately and reliably to uniform pressure conditions including non-gaseous environments and industrial processing environments are disclosed. Also discloses are methods of making and using the devices.

25 Claims, No Drawings

PHYSICAL/CHEMICAL UNIFORM PRESSURE INDICATING CONSTRUCTS INCLUDING CHEMISTRIES, FILMS AND DEVICES CONFIGURATIONS

CROSS-REFERENCE TO RELATED APPLICATIONS

Pursuant to 35 U.S.C. §119 (e), this application claims priority to the filing date of: U.S. Provisional Patent Application Ser. No. 60/894,403 filed Mar. 12, 2007, the disclosure of which application is herein incorporated by reference.

INTRODUCTION

There exist a variety of applications where it is desirable to measure and report pressures that have occurred during processing events, applied pressure events, sterilization processes, pressure recording events, and the like. Likewise, it is often important to enable the recording of such pressure processing events in different phases including under including gaseous, liquid, and sold phase systems.

High Pressure Processing (HPP) can be extremely effective in destroying food-borne pathogens and spoilage organisms. HPP is utilized by leading food producers, meat and poultry producers, processed foods producers, canned foods producers, frozen food manufacturers, beverage manufactures, condiment producers, seafood suppliers, and the like can not only a longer shelf life but also preserves foods' nutritional value and organoleptic characteristics such as fresh taste, color and texture. High pressure sterilization systems have been found to be effective in destroying almost all major food-borne pathogens, including *Listeria monocytogenes*.

Food industry experts are aware that the CDC estimates that 5,000 deaths take place each year due to food borne illness. The economic burden is substantial and the societal cost of deaths, 300,000 hospitalizations and 70 million sickness reaches into the billions of dollars.

Companies and technologies that either process foods or produce equipment or services for high pressure sterilization can benefit from reliable low cost visual means for indicating that adequate pressures have been achieved. High pressure sterilization or pasteurization is used on a commercial basis to provide an effect similar to pasteurization for refrigerated ready-to-eat (RTE) foods. HPP is accepted by the FDA and USDA as an effective food safety intervention method. A new definition of "pasteurization" as recommended by the National Advisory Committee on Microbiological Criteria for Foods (NACMCF) supports the use of HPP as an alternative non-thermal pasteurization approach.

HPP is a recognized "post-lethality" interventions step for ready-to-eat meats. HPP's ability to kill *Listeria monocytogenes* (LM) is well documented. Furthermore, validation tests on commercial RTE meats that contain lactates well below the limit for labeling, at flavoring levels, show that LM injured by intentional HPP under-processing do not recover and eventually die. This ability to suppress LM growth through out the shelf-life of the product combined with the post-lethality step combine to support the Alternative 1 status under the USDA FSIS LM control rule.

In addition, HPP can kill *salmonella* at levels that meet the definition by USDA of a "lethality step". HPP meats may qualify for "cook-in-the-bag" status since the product remains packaged after HPP. There is no post-lethality contamination possible. Further developments in pressure sterilization and pasteurization processed are under development on an on-going basis. For example new equipment and processing methods provide for both simultaneous and sequential processes involving both high pressure and temperature. Devices for rapidly monitoring qualitatively and quantitatively that processing parameters have been accurately met are described here within.

SUMMARY

Pressure measurement and recording mediums and devices that can respond accurately and reliably to uniform pressure conditions including non-gaseous environments and industrial processing environments are disclosed.

Indicating pressures of interest can range from les than 0.2 megapascals (Mpa) or 30 pounds per square inch (psi) to greater than 7,000 Mpa or 1,000,000 psi. In certain embodiments, uniform pressures will measured in the range from 4 Mpa or 580 psi to 3,500 Mpa or 500,000 psi. In certain embodiments, involved pressures of particular interest for food safety range from 400 MPa (58,000 psi) to over 700 MPa (100,000 PSI).

Protection measurement materials including chemistries, films, and devices from severe processing environments during pressure monitoring and reporting becomes integral to successfully preserving the information recorded by the material. Disclosed here within are practical pressure monitoring and reporting devices that integrate the elements of a pressure indicating means, configurations that direct pressures to be exerted in a direction compatible with maintaining device stability, and designs that are protective of the devices functional components when subjected to liquid, gaseous, or solid pressure induced environments. The unique combination of elements provide for simple to interpret and use, low cost, and robust sensor devices and products that permit qualitative, semi-quantitative, and quantitative measurement of pressure exerted during high pressure processes.

DETAILED DESCRIPTION

As summarized above, pressure measurement and recording mediums and devices that can respond accurately and reliably to uniform pressure conditions including non-gaseous environments and industrial processing environments are disclosed.

Before the present invention is described in greater detail, it is to be understood that this invention is not limited to particular embodiments described, as such may vary.

It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Pressure Directed Stability and Indication Within Uniform Pressure Environments:

Device designs and configurations include those in particular that can render a visual optical change and yet maintain stability when exposed to a uniform pressure vector environment. Device configurations include but are not limited to disc, sheet, coin, tab, planar, and relief structures that can be stable and non-responsive in one plane of uniform pressure and be responsive to an identical pressure level exerted tangential or out-of-plane with respect to another axis of the device. By way of example, in a planar disc format, whereas the pressure exerted on the edge of a disk may be equivalent in magnitude per area compared to the perpendicular surface of the disc, the pressure exerted on the planar surface of the disc may impart a much larger material affect on the planar surface because there exists no radial support in-plane compared with the rounded edge of the disc and because the disc edge has a finite area compared to the disc surface.

The edge pressure effect has been found to be minimal compared with the pressure exertion on the upper or lower surface of a planar device configuration. As such, a variety of devices have been designed and successfully tested that utilize a protected pressure sensitive optical change (e.g., dye) layer laminated or contained within planar format. Conveniently devices are constructed with top optically clear (i.e., transparent) layer that serves as a protective layer, a compression surface, and a viewing window. The top layer can be conveniently adhered or in direct contact with/to a dye layer or film that responds to pressure by exhibiting an optical change effect such as a visual color change. The top layer is adhered beyond the outer edges of the dye layer region such that a hermetic protective seal is formed around the edges of the dye layer region. The top layer in combination with a hermetic/adherent seal and a bottom substrate layer completes the enclosure of the dye layer region. The enclosed and protected dye layer can be directly visually observed and be responsive only to the induced pressure without being adversely effected by the surrounding aqueous or gaseous conditions.

The top layer acts as a pressure tranducer perpendicular to the plain of the optical pressure indicating chemistry or material. Since the device configuration is thin and has radial or lateral strength and rigidity, the device itself can be structurally strong and need not arbitrarily deform during the pressure indicating process.

Top Laminating Layers and Materials:

Any convenient transparent, semi-transparent, and/or tinted but visibly clear top laminating layers may be employed for this layer. In certain embodiments, the layer provides both protection from severe pressure environments and conditions as well as a visible means to view an optical change reaction that has occurred as a result of encountering a pressurized event.

Top laminating layers can be utilized in a variety of thickness depending on the device design and application of interest. Thicknesses of top laminating layers are practical between the range of 0.5 inches and 0.0001 inches, such as between 0.25 inch and 0.0005 inch and including between 0.125 inch and 0.001 inch. In certain embodiments, the layers are between 0.1 and 0.002 inches thick.

Top laminating layers can be comprised of a wide range of different materials including clear coats, clear coating inks, UV inks, thermal set inks, laminating adhesives, hot melt adhesives, tapes, clear label materials, pliable and rigid materials, coating compounds, liquid resins that can be catalyzed to a solid layer, plastics, resins, plastic sheet materials, spray on coating, clear coat finger nail polish, clear varnish, clear solvent base glues, clear rubberized materials, rigid plastics, clear lacquer coats and the like.

The thickness of the top layer can be used to modulate the pressure impact imparted on pressure indicating dye system. Thin compliant layers can be utilized to induce more localized pressure indicating effects. Thick more rigid to layers can be utilized to integrate and average the total applied perpendicular pressure over a broader surface area of an underlying pressure indicating dye layer. Compliant layers find use for more flexible device configurations. Rigid layers find use where rigid device substrates applications are preferred.

Plastic/composition types for top laminating layers can include, but are not limited to: polyvinyl chloride (PVC), various polyolefins such as polypropylene and polyethylene, high density polyethylene (HDPE), low density polyethylene (LDPE), cross-linked high-density polyethylene (XLPE), softened acrylic, ABS, thick Kapton™ tape materials, Teflon® (polytetrafluoroethylene (PTFE), tetrafluoroethylene TFE and fluorinated ethylene polyproplyene FEP)-based materials, brand names such as Kydex, polystyrene, thermoplastic polyesters, nylon, styrene-butadiene, epoxy casts, polybutylene, TPX (poly(methyl pentene), terephtalate polyethylene (PET), PETE, PETF, polyethylene teraphthalate G copolymer (PETG), polysulfone (PSF), polyutethane (PUR) Thermanox™ (TMX), polymethylmethacrylate, and the like.

Strong flexible plastics such as polycarbonate are often desirable. Polycarbonate can be thermoformed, pressure formed, and injection molded.

Other exemplary plastics may include, but are not limited to: ethylenechlorotrifluoreethylene (ECTFE), ethylentetrafluorethylene (ETFE), polinvinylidene fluoride (PVDF), ethylene-propylene rubber (EPR), silicone rubber (SI), Alcryn® thermoplastic rubber (TPR), HT thermoplastic rubber (HTPR), Santoprene® thermoplastic rubber (TPR), LSOH crosslinked compounds, LSOH thermoplastic compounds, methylvinyletherfluoralkoxy (MFA), perfluoroalkoxy (PFA), thermoplastic polyester elastomer (TPE), polyimide (Kapton®), polyurethane (PUR), polyvinyl chloride 105° C. (PVC), polyvinyl chloride 70° C. (PVC), low temperature polyvinyl chloride (LTPVC), oil resistant Polyvinyl chloride (OR PVC), semirigid polyvinyl (SR PVC), polyvinyl chloride polyurethane (PVC PUR), silicon rubber, ethyl vinyl acetates, acrylic, styrene, polystyrene and the like.

Pressure Sensitive Optical Change Layers, Chemistries, and Materials:

Dye chemistries, can be applied directly to a substrate in a printed format or used in a device configuration as a film that can be layered into the device. A dye chemistry can be purchase in a film form and utilized as a layer in the device. Various carrier plastics and/or layers can be used as carrier layers for a pressure sensitive chromic change agent. Polyester substrates serve as convenient layer supports for optical change dye layers to be adhered to.

Pressure sensitive or responsive dyes are of particular interest for monitoring and measure a pressure event at a given pressure. Encapsulated single component or dual multi-component dye systems are of interest where the encapsulating coating surround a dye or technical dye component can be rupture at a specified pressure of interest. Polymeric dyes that undergo a conformational change under a particular pressure are of interest due to optical changes that can be induced due to certain pressure exerted. Diffusion dye systems are of interest where a dye layer is induced to diffuse through a porous diffusion layer when exposed to a pressure of interest. Pressure induced diffusion can be horizontal in the plain of a device or vertical within or between dye layers or adjacent layers.

Sensitizing such as hydrochromic dyes are of interest where a pressure of interest is exerted on a pressure transducing material that cause movement of a aqueous medium to be forced in contact with the hydrochromic dye layer. Phase change compositions are of interest whereby in a pressure induced state, a chemical composition can undergo a transition from one physical phase to a second observable physical phase. By way of example, a liquid material can be irreversibly crystallized at a per-determined pressure. The crystalline phase would be observably different than the initial liquid phase. Pressure induced chemical reactions can be utilized as an optical change means. By way of example, the chemical reaction rate for the chemical synthesis of a dye molecule can be accelerated or permitted under high pressure conditions whereas no reaction or dye formation will occur under ambient pressure conditions. Pressure induces fracturing of a brittle layer can be utilized as and optical change mechanism. By way of example, a brittle layer can be directionally fractured during a pressure induction event providing for a visible optical change to occur.

Pressure sensing optical change recording devices can utilize a variety of dye systems that are determined by the product application of interest. Encapsulated dyes, polydiacetylenes, leuco dyes, solvent chemically initiated color change systems, frictionally sensitive dyes, separated dye layers, partition dyes, electron transfer dyes, two-component chemical dyes, organic and inorganic color change dye systems, acid/base dye systems, encapsulated acid/base dye indicating systems, encapsulated electron transfer dye systems, melting waxes, sublimation dyes and the like can be utilized. One or more dye-layers of a given dye system can be utilized alone or in combination with alternative dye systems.

Thermochromic dyes can find use in a variety of compositions and applications and formats. Thermochromic dyes can include but are not limited to compounds including: bis(2-amino-4-oxo-6-methylpyrimidinium)-tetrachlorocuprate (II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium) tetrachlorocuprate(II) and bis(2-amino-4-chloro-6-methylpyrimidinium) hexachlorodicuprate(II), benzo- and naphthopyrans (Chromenes), poly(xylylviologen dibromide, di-beta-naphthospiropyran, Ferrocene-modified bis(spiropyridopyran), isomers of 1-isopropylidene-2-[1-(2-methyl-5-phenyl-3-thienyl)ethylidene]-succinic anhydride and the Photoproduct 7,7adihydro-4,7,7,7a-tetramethyl-2-phenylbenzo[b]thiophene-5,6-dicarboxylic anhydride, and the like.

Other thermochromic dyes of interest include leucodyes including color to colorless and color to color forumations, vinylphenylmethane-leucocynides and derivatives, fluoran dyes and derivatives, thermochromic pigments, micro and nano-pigments, molybdenum compounds, doped or undoped vanadium dioxide, indolinospirochromenes, melting waxes, encapsulated dyes, liquid crystalline materials, cholesteric liquid crystalline materials, spiropyrans, polybithiophenes, bipyridine materials, microencapsulated, mercury chloride dyes, tin complexes, combination thermochromic/photochromic materials, heat formable materials which change structure based on temperature, natural thermochromic materials such as pigments in beans, various thermochromic inks sold by Securink Corp. (Springfield, Va.), Matusui Corp., Liquid Crystal Research Crop., or any acceptable thermochromic materials with the capacity to report a temperature change or can be photo-stimulated and the like. The chromic change agent selected will depend on a number of factors including cost, material loading, color change desired, levels or color hue change, reversibility or irreversibility, stability, and the like.

In certain embodiments, irreversible leuco dye compositions that involve encapsulated dyes/activators are employed. Dye systems can include the activation component encapsulated in one species of micro-particles and an uncolored dye encapsulated in a second species of micro-particulate. No color occurs when the two components are mixed until the encapsulation of both micro-particulates are simultaneously ruptured and the un-activated dye can be activated by the released activator. Dye system sources can be obtained from various vendors for formulating intrinsic color change substrates. Selected vendors include: Thermographic Measurements Ltd. (TMC, United Kingdom), NuCoat, Inc. (North Plymouth, Minn.), Appleton Papers Inc. (Appleton, Wis.) as well as other custom suppliers and processors.

Certain dyes specified as thermochromic dyes by vendors or manufacturers can be converted to frictionally responsive or sensitive dye layer systems. For example, irreversible thermochromic ink formulations can be coated on substrates and triggered using frictional or compression means for initiating a color change. Color change systems that have multiple elements including a printed substrates, top laminating layers, adhesive layers, reference color layers, supporting substrate layers, and attachment adhesive layers.

Of further interest are pressure indicating pigments and films that respond locally and specifically to an applied pressure by changing color in response to the applied pressure. Pressure indicating films can include, but are not limited to carbon papers, Pressurex™ films, pressure sensing films from Fuji Film Company, pressure indicating dyes, encapsulated pressure indicating dyes and the like. Likewise, direct thermal printing papers and films can be used as a commercially available source for color change substrates. Thermal papers are available in various colors including white to black, white to blue, and white to red. Direct thermal papers can be over coated or printed so that the initial white color can be a color other than white and the color transition can be color to color. Importantly, thermal papers can be further treated in additional intrinsic color change dye layers to create multicolor change substrates.

Additional examples include, but are not limited to those dyes dislcosed in U.S. Pat. No. 5,990,199, the disclosure of which is herein incorporated by reference; tamper evident dyes that respond to a pressure event through a color change, security inks that can be printed in a particular manner or pattern, indicator inks used in sterilization processes, tactile pressure indicating films, inks used in pressure mapping, compressable "puff" inks made with ink additives used for printing expanded patterns and print, dye migration inks where dyes migrate only under pressure, dye transfer inks where dyes transfer only under pressure, as well as a series of other related inks and ink processes that can be use Pressure indicating optical change dyes can be used within the same device and have pressure triggering set points at that represent different pressure levels and can therefore be quantitative for increase pressure sensing accuracy. Alternatively, a single pressure sensing dye layer can respond with different color densities to different pressure levels. Such devices may conveniently have a stationary color reference zone that can be calibrated to indicate the achievement of certain pressures within a given pressure range for a particular dye type.

Fuji Film Company and/or related companies including Itochu Canada Ltd, Sensor Products, Inc., SPARE s.a.s. are representative companies that supply available pressure sensing films that can be used in the device configurations disclosed herewithin. Auto-N is, Nip Products, EZ-Nip, P-Nip, Sigma-Nip, Pressurex Film, TemprX, Pressurex-micro products and films from Sensor Product Corporation and Ultra Super low pressure, Super low pressure, Low pressure, Medium pressure, High pressure, Super High pressure films from Fuji Films can be utilized by way of example as film layers that can be incorporated into a laminated layer configuration that is water resistant and can tolerate of severe conditions encountered using commercial high pressure sterilization systems. Alone and without incorporation into the disclosed device configurations, water and environmental conditions have been found to render such film and chemistry type useless.

Importantly, the absolute pressure indication setting for a particular film type of interest can be off-set or adjusted by incorporating the film into a pressure sensing/modulating physical structure. The physical structure can be designed to respond to a higher or lower pressure setting than the pressure indicating optical change film. By way of example, but not limitation, the physical/structural response of a sensor can be set a level significantly higher than the pressure setting of a film type. A film type that has the pressure indicating dynamic range from 7,000 psi to 18,000 psi can be used with a physical laminate or relief structure that responds to 80,000 to 90,000 psi. The resulting device can be used for monitoring pressures significantly higher and off-set compared with the intended pressure setting for a pressure indicating film.

Alternative thermochromic materials can find use including, but not limited to: light-induced metastable state in a thermochromic copper (II) complex *Chem. Commun.*, 2002, (15), 1578-1579 under goes a color change from red to purple for a thermochromic complex, [Cu(dieten)2](BF4)2 (dieten=N,N-diethylethylenediamine); encapsulated pigmented materials from Omega Engineering Inc.; bis(2-amino-4-oxo-6-methyl-pyrimidinium)-tetrachlorocuprate (II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium)-tetrachlorocuprate(II); bis(2-amino-4-chloro-6-methylpyrimidinium) hexachlorod-icuprate(II); cobalt chloride; 3,5-dinitro salicylic acid; leuco dyes; spiropyrenes, bis(2-amino-4-oxo-6-methylpyrimidinium) tetrachlorocuprate(II) and bis(2-amino-4-chloro-6-methylpyrimidinium) hexachlorodicuprate(II), benzo- and naphthopyrans (Chromenes), poly(xylylviologen dibromide, di-beta-naphthospiropyran, Ferrocene-modified bis(spiropyridopyran), isomers of 1-isopropylidene-2-[1-(2-methyl-5-phenyl-3-thienyl)ethylidene]-succinic anhydride and the Photoproduct 7,7adihydro-4,7,7,7a-tetramethyl-2-phenyl-benzo[b]thiophene-5,6-dicarboxylic anhydride, and the like. Encapsulated leuco dyes are of interest since they can be easily processed in a variety of formats into a plastic or putty matrix. Liquid crystal materials can be conveniently applied as paints or inks to surfaces of color/shape/memory composites.

In certain embodiments, polydiacetylenic dyes are employed for thermochromic dye mediums due to their high extinction coefficient, reversible or irreversible color change characteristics, ease of coating and printing, ease of modification for temperature setting adjustment, low level of migration on a printed substrate, large dynamic color change range, their characteristics of being able to be printed at high resolution, compatibility to be used in combination with other thermochromic dyes, ease of formulation into a range of different ink resin matrices, potential for low levels of toxicity due to their large molecular weight, and facile nature for undergoing color change transitions utilizing a variety of different triggering mechanisms.

Pressure sensitive dye systems color options can include by way of example, but not by limitation: yellow to colorless, orange to color less, red to colorless, pink to colorless, magenta to colorless, purple to colorless, blue to colorless, turquoise to colorless, green to colorless, brown to colorless, black to colorless. Color to color options include but are not limited to: orange to yellow, orange to pink, orange to very light green, orange to peach; red to yellow, red to orange, red to pink, red to light green, red to peach; magenta to yellow, magenta to orange, magenta to pink, magenta to light green, magenta to light blue; purple to red, purple to pink, purple to blue; blue to pink; blue to light green, dark blue to light yellow, dark blue to light green, dark blue to light blue; turquoise to light green, turquoise to light blue, turquoise to light yellow, turquoise to light peach, turquoise to light pink; green to yellow, dark green to orange, dark green to light green, dark green to light pink; brown and black to a variety of assorted colors, and the like. Colors can be deeply enriched using fluorescent and glow-in-the-dark or photo-luminescent pigments as well as related color additives.

Reversible and irreversible versions of the color change agent can be employed depending on the desired embodiment of interest. Reversible agents can be employed where it is desirable to have a multi-use effect or reuse the color change effect. For example, products with continued and repeated use value will find utility of a reversible color change component comprising the final embodiment. In this case it would be desirable to utilize a reversible thermochromic or luminescent material which can be repeated during usage. In another example, it may be desirable to record a single color change permanently. In this case, it would be desirable to utilize a thermochromically irreversible material which changes from one color to another giving rise to a permanent change and indicating that the composition should be discarded after use.

Dyes can be added into ink, printing or coating from 0.001% by weight to 80% by weight, such as in the range form 0.01% to 50% by weight, including in the range from 0.1% to 25%, e.g., in a range from 0.5% to 5%.

Optical Pattern and/or Message Development:

Optical patterns can be developed under pressure conditions using optical color change dye systems in combination with modeled substrate surfaces. An image can be generated by applying a pressure indicating film over a substrate layer that has been pre-surface textured or patterned. As pressure is induced when the dye layer initially comes in contact with the close proximity regions or features of the patterned substrate surface. An initial color change will occur in the dye layer that emulates the upper surfaces of the substrate. As pressure continues to increase, the dye layer may be forced in contact with lower regions of the substrate surface texture. Images or patterns can appear differentially as a result of the final pressure induced between the pressure indicating dye layer and the patterned or textured substrate. Partial images can be made to occur at lower pressures. More complete or developed images or messages can be made to appear at medium pressures. Fully developed images or completed messages can be made to appear at final desired induced pressures.

Selected pressure points can be latent in the substrate layer such that only those pressure points induce a localized pattern or message. Regions adjacent to a pressure point can be deep within the substrate layer such that no color development occurs in the non-contact region. Engraved lettering in a substrate can be used to develop a clear and discernable message as outlined by the engraved region.

By way of example, but not limitation, patterns can be molded into a substrate surface, embossed in the surface, laser etched, scribed, compressed, layered, printed, modeled, engraved, chemically etched, photographically etched, machined stenciled, be comprised with a patterned meshed material or textured material such as fabric, cloth or screen, or the like. Substrates can be pre-prepared with a pattern, message or image, or be over-layed in a laminated form prior to layering a pressure indicating film or dye layer.

Messages or patterns developed can be further informative to one viewing the result of a pressure event. For example, a message can indicate "pressure achieved" or "pressure not achieved". Pattern formats can be further utilized to inform a user that a particular pressure processing step has been successfully accomplished or not.

Messages can be further revealed or obscured by a pressure event. By way of example a colored mark per-placed on the surface of a pressure sensitive optical change film can be made to appear to disappear when the color of the optical change dye changes to match the color of the mark. Red marks for example can be made to disappear when the mark is made over a color change sensing layer as the layer turns a red coloration as dark or darker than the mark. Check marks, symbols, messages, figures, graphics, or other printed information or images can be made to change in color or become obscured during the pressure induction process.

Reference Color Calibration Zones:

Reference color calibration zones can be printed adjacent to a region of pressure indicating chromic agent. Alternatively, a pressure indicating optical change agent can be printed directly onto a pre-printed reference color region. The colored reference zone can be color matched to indicate a particular stage of pressure induced during a pressurization event. Calibration zones can be a single coloration, multiple colorations, a gradient of colorations or the like. The color intensity of a given reference region can be pre-calibrated both in color hue and density. Color reference zones can be imprinted to indicate a certain pressure setting or can be simply a colorized region.

Application and Protection Methods:

Pressure sensitive dyes can be applied to a substrate in a flood coated manner or be printed in a design, pattern, message, format, graphic, lettering, message or any other convenient means that will provide for an objective visual means. A dye system can be continuously printed or discontinuously printed. The type of visual format desired will depend on the device design configuration. Dye systems can be printed using conventional printing processes including but not limited to ink jet printing, coating, flexographic printing, sublimation printing, off-set printing, marking, or the like.

Continuous printed or coated surfaces can be sealed and protected from aqueous pressure environments by over-laying a coating layer that allows the dye system to respond to a pressure event, but such that the dye system is not adversely impacted by any impending fluids or pressure environmental components. By way of example, a pressure sensing film from Sensor Products, Inc. or the Fuji Film Company, can be treated with a hot melt adhesive or ultraviolet curable liquid. In either case, the dye layer becomes further encapsulated and protect from attack by water yet can still respond to a high pressure sterilization process utilizing an aqueous medium.

Alternatively, a region or area of pressure sensing film or a printed region of pressure sensitive dye can be surrounded completely by an adhesive layer, film, hot melt compound, sealing material, coating or the like such that the discontinuous region of dye is impenetrable by water.

Bottom Substrate Laminating Layer:

Bottom substrate layers can be either optically clear, semi-transparent, or optically opaque. The bottom substrate layer can be either rigid or compliant. Typically, rigid substrates will find use if the item to be exposed to pressure is compliant. Likewise, compliant substrates will find use if the item to be monitored under pressure is rigid. In either event, it is important that the compliance of the substrate layer augments and dose not adversely effect devices ability to measure a pressure of interest and that the substrate layer serve to support the additional layer comprising the device.

Bottom laminating layers can be utilized in a variety of thickness depending on the device design and application of interest. In certain embodiments, thicknesses of bottom laminating layers range from 0.5 inches and 0.005 inches, such as from 0.25 inch and 0.01 inch, and including from 0.125 inches and 0.05 inches.

Substrate laminating layers can be made conveniently of metals, plastics, rubber, glass, wood, ceramic, composite materials, or any like-kind material that provides adequate support for upper laminating layer as well as stability under high pressure environments and conditions. Substrate layers can be made of cast materials, roll stock materials, injection molded plastics, machined metals, or the like.

Plastic/composition types for bottom laminating layers can include, but are not limited to: polyvinyl chloride (PVC), various polyolefins such as polypropylene and polyethylene, high density polyethylene (HDPE), low density polyethylene (LDPE), cross-linked high-density polyethylene (XLPE), softened acrylic, ABS, thick Kapton™ tape materials, Teflon® (polytetrafluoroethylene (PTFE), tetrafluoroethylene TFE and fluorinated ethylene polyproplyene FEP)-based materials, brand names such as Kydex, polystyrene, thermoplastic polyesters, nylon, styrene-butadiene, epoxy casts, polybutylene, TPX (poly(methyl pentene), terephtalate polyethylene (PET), PETE, PETF, polyethylene teraphtalate G copolymer (PETG), polysulfone (PSF), polyutethane (PUR) Thermanox™ (TMX), polymethylmethacrylate, and the like. Strong flexible plastics such as polycarbonate are often desirable. Polycarbonate can be thermoformed, pressure formed, and injection molded.

Other exemplary plastics may include, but are not limited to: ethylenechlorotrifluoreethylene (ECTFE), ethylentetrafluorethylene (ETFE), polinvinylidene fluoride (PVDF), ethylene-propylene rubber (EPR), silicone rubber (SI), Alcryn® thermoplastic rubber (TPR), HT thermoplastic rubber (HTPR), Santoprene® thermoplastic rubber (TPR), LSOH crosslinked compounds, LSOH thermoplastic compounds, methylvinyletherfluoralkoxy (MFA), perfluoroalkoxy (PFA), thermoplastic polyester elastomer (TPE), polyimide (Kapton®), polyurethane (PUR), polyvinyl chloride 105° C. (PVC), polyvinyl chloride 70° C. (PVC), low temperature polyvinyl chloride (LTPVC), oil resistant Polyvinyl chloride (OR PVC), semirigid polyvinyl (SR PVC), polyvinyl chloride polyurethane (PVC PUR), silicon rubber, ethyl vinyl acetates, acrylic, styrene, polystyrene and the like. Plastics will find particular use for low cost single use devices.

Metal substrate layers can be utilized under particularly sever pressure environments. Metals will find use where it is relevant to use a rigid substrate rather than a compliant substrate. Typical metals can include but are not limited to aluminum, alloys, iron, stainless steel, magnesium and the like. Metals will find particular use for reusable devices.

Adherent Laminating Layers:

Adherent laminating layers comprise a material means for adhering the top layer to a dye layer and the dye layer to a bottom substrate layer. The adhering layer further provides a protective hermetic seal that protects the optical change agent or dye layer from the ambient environment encountered during the pressure sterilization process. The adherent laminating layer can be made using single or double sided adhesives or adhesive coatings. By way of example, the adherent layer can be a thick or thin clear tape, a clear plastic label stock, a double sided adhesive tape, a double sided adhesive released from a release paper or substrate, a cold laminating material, a hot laminating substrate generally useful for hot lamination materials and processes.

Independent or Integrated Pressure Sensor Configurations:

Pressure indicating devices can be produced and made separately and subsequently attached to a product type that will be exposed to a high pressure sterilization process or the indicating device can be comprised or integrated in part and produced as part of the product package that is to be high pressure sterilized. By way of example, the surface of a meat package can be utilized as the bottom substrate laminating layer. The pressure sensing dye layer can be printed on the package and subsequently over-coated with the top laminating layer to complete a device configuration.

Shape Memory/Deformation Materials:

Pressure sensitive shape memory or shape deformation materials including plastics, composites, single component systems, multi-component systems and the like can be effectively utilized as sensing and monitoring components in a uniform pressure indicating device. Shape memory materials including shape memory plastics can be formulated to respond to a given pressure induced level. Devices can be designed so that the shape memory composition can be forced to flow with in a given pattern or design as to indicate that a pressure event achieved a desirable pressure level.

Relief Structure-based Designs:

Relief structures can be made in plastics or related composites that surround a gas or compliant medium such that uniform pressures cause collapse of the relief structure in a predictable pattern or configuration. The designated collapse indicates that a pressure event has occurred at a given pressure level.

Relief structures can be made in plastics or related materials using thermoforming, blow molding, pressure forming, injection molding, heat conditioning, or the like. A relief structure can be designed such that exerting pressures cause a pre-designated collapse configuration. Folds, grooves, facture marks, valleys, angles, flat surfaces, curved surfaces can be used alone or in combination to design a particular collapse sequence or configuration.

Relief structures can be molded in the form of a dome, arch, disc, cone, or a variety of other radial or geometric designs such a geodesic designs that form a collapsible/compressible inner pocket whereby the inner collapsible pocket dissipates in response the collapse process. Of particular interest are structures that exhibit a high degree of structural integrity including domes and radial designs that can withstand unified pressure vectors during a pressurization event until such pressures are achieve that cause an intended structural failure at a pre-determined pressure.

Relief structures can be utilized that have a pre-designed differential pressure response in one plane or physical direction whereas the device is retains structural integrity in other directions. By way of example, but not limitation, a hollow pedestal made with a uniform thickness and strength of a material will withstand high pressures in the radial direction of its configuration whereas it can be designed to readily structurally collapse in the vertical direction perpendicular to the plan of the top of the pedestal. Conversely, a hemispherical dome can be employed that will withstand equal pressure load in any direction perpendicular to the plane of the dome at a particular point on the dome surface. Defects, inclusion, structural features, flaws, divots, or other related surface feature can serve as a physical triggering point on the relief structure that initiates collapse under a pre-determined pressure load. In certain embodiments, the relief structure is designed to undergo a controlled collapse sequence rather than a randomized collapse process without a defined final collapse configuration.

Combination Physical/Chemical Indicating Device Configurations:

Physical/chemical device combinations that employ a pressure responsive optical change chemistry that either at or matches the threshold pressure achieved during processing or where the chemistry is set to respond above or below the actual intended pressure to be achieved during processing. Structural physical features such as relief structures describe in this disclosure can be designed and utilized with a device configuration that augment a pressure responsive color change. The physical feature or structure can conveniently be made of a plastic, metal, or other convenient material that is used to transduce the actual intended pressure. The structural feature can be made to come in contact with a pressure sensitive optical change agent, but only when the intended threshold pressure is achieve. The corresponding color change can then be delayed until such time that the physical/ structural feature of the device responds to a pressure level and thereby in response, comes in physical contact with the dye chemistry causing the dye chemistry to in turn respond.

Device configurations of this type can be constructed that utilize a pressure responsive material or chemistry that is formulated to change at a pressure below the intended pressure range to be measured or achieved, but be calibrated to actually report a higher pressure achieve during use. Devices of this configuration provide for the use of broader potential range of pressure indicating dye chemistries in that the final control mechanism of the device is dictated by a physical/structural response, but the response is recorded by a subsequent chemical color change process.

By way of example, optical change chemistries can be utilized that respond to pressures in the range of 30 to 80,000 pounds per square inch (psi) whereas the physical/structural response of the device responds at above 80,000 psi. Devices with a physical/structural delay have the advantage of being able to utilize a much broader array of dye chemistries than only those than can be made to undergo an optical change at or above 80,000 psi.

Physical/structural features designed for responding with a physical change at high pressure settings can incorporate structural relief features that maintain structural integrity up until a particular pressure load setting is placed on the device. Dome features, arch features, radial features, thickened or pressure hardened surfaces an be utilized that when a pressure response occurs, part or all of the physical feature come in intimate contact with a pressure indicating chemistry. The feature material acts to subsequently compress the pressure indicating dye chemistry or film such that a visual optical change occurs.

Multi-Parameter Measurement Devices:

Combination measurement approaches can be employed in parallel or at the same time of use as high pressure indication. Other kinds of HPP techniques, for instance, high pressure sterilization. In high-pressure sterilization, temperature is used in conjunction with high pressure to destroy spores. Combination pressure and temperature indicating chemistries and substrates can be employed whereby a thermochromic material can both transduce a temperature change and likewise respond a to the temperature affect at an elevated pressure.

The following examples are offered by way of illustration and not by way of limitation.

EXPERIMENTAL

Example 1

Test Low, Medium and High Pressure Test Vessels

Simple low-cost pressure vessels were prepared for rapid testing and prototyping of pressure indicating devices and configurations. A pressure test vessel is constructed using the components of 5, 10, 20, 30, or 50 ton hydraulic jacks. The center piston and cylinder is emptied and removed of hydraulic fluid. The collar, piston and cylinder can be replaced and seated in an open metal support frame.

The modified jack (test pressure vessel) can be filled with water to emulate a high pressure sterilization unit. Devices to be tested can be placed in the water filled cylinder and the piston placed into the open top to seal the modified jack.

The extended modified jack can be subsequently be placed or stacked on top of a higher pressure or like-pressure functional jack within the frame. The stacked system including the test pressure vessel can be compressed using the lower stacked hydraulic jack. When final pressure is achieved using the lower stacked pumping jack, the pressure can be released and the piston in the test pressure vessel removed for inspection of a pressure sensor.

Example 2

Laminated/Protected Pressure Indicator

A laminated pressure indicator is made by laminating a dye film between a transparent top layer and a semi-rigid bottom substrate layer. The basic sensor design involves a sandwich lamination that sandwiches the dye layer between two structural layers. Strong water resistant 0.005 inch thick transfer adhesive is preferred for room temperature laminations (3M Company Inc.) The layers are adhered together using a double-sided adhesive film.

For construction, 0.25 inch square pieces of Pressurex™ film (Sensor Products Inc.) were individual cut from sheets of ULTRALOW 28-85 PSI (2-6 kg/cm), SUPER LOW 70-350 PSI (5-25 kg/cm2), LOW 350-1,400 PSI (25-100 kg/cm2), MEDIUM 1,400-7,100 PSI (100-500 kg/cm2), HIGH 7,100-18,500 PSI (500-1,300 kg/cm2), SUPER HIGH 18,500-43,200 PSI (1,300-3,000 kg/cm2). Each piece was placed on independently cut plastic tiles (0.5 inch square, 0.04 inch thick red colorized high impact polystyrene). The coloration of the polystyrene sheet was selected to match pressures of interest for the corresponding color change of each Pressurex™ film types. The pressure indicating film pieces were placed centered with the plastic polyethylene terephthalate side up and dye layer side down on the polystyrene tiles.

A top protective layer was prepared by adhering one side of a 0.007 inch thick clear polyester film (0.5 inch squared) to an adherent 0.005 inch thick double sided transfer adhesive layer. The backing was pealed off and the adherent polyester film was pressed directly and squarely onto the pressure sensing film on the polystyrene tile. The pressure sensing film become encased and surrounded on each side with a 0.25 inch border of adhesive and laminating layers while the film's plastic side was protected and visible though the polyester film layer. Each finished sensor was firmly pressed to ensure that all entrapped air bubbles were removed between each layer. Sensors were finished by applying an adhesive to the bottom side of the bottom polystyrene substrate. The sensors were stored prior to use under normal ambient conditions.

Example 3

Pressure Indicating Dye Composition and Coating Process

A pressure indicating leuco dye composition was prepared using an encapsulating coating that responds to particular pressures of interest by adjusting the coating thickness and coating type. Either acid/base color change systems, donor acceptor color change composition systems, activator/dye systems, or charge transfer color change composition systems were encapsulated using standard leuco dye encapsulating processes. The hardness, strength, integrity and pressure fracture properties of the encapsulation compositions were selected to match a particular pressure level of interest. Encapsulation coatings and processes were further adjusted as to not interfere with the chemical color change properties of the color change system. Either both dye par members could be encapsulated of only a single dye pair member of a system needs to be encapsulated. In either case each dye pair member must be separated from the other member prior to utilization during pressure exposure.

Encapsulated dye pair member systems can be further processed into ink or coating formulations including a liquid carrier medium that is compatible with the suspension and stabilization of an encapsulated dye, a binder for adhering the dye system to a substrate, and any necessary stabilizing components needed to mitigate any unwanted dye migration and unwanted color development. Emulsifier and surfactants can be further added to improve coating and flow characteristics during application of the dye ink to a substrate layer. Processed coating solutions can be adhered directly to a substrate, film, surface, bottom substrate layer or other convenient surface intended as part of a finished pressure indicator.

Example 4

Pressure Indicating Sensor Using Printed Pressure Indicating Dye Composition

Pressure indicating ink solutions were prepared according to Example 3 above. The solution was coated on to and acceptable substrate surface pre-processed to accept an ink coating layer. Printable polyester or PET films ranging in thickness from 0.003 inch to 0.010 inch thick were printed using standard printing methods including ink jet printing, screen printing, or flexographic printing. Inks were formulated according to the printing process of choice. Thicker more viscous inks were used for screen printing whereas thinner less viscous inks solutions were utilized for ink jet and flexographic printing. Ink layers were printed either in a flood coated continuous layer or in discretely printed zones on the surface of 0.007 inch thick clear printable polyester film. Samples were dried by force air. Printed processed pressure sensing film samples could be used in sheet form, die cut, or slitted into roll stock for further conversion into pressure indicators.

Processed sensing films were converted into pressure indicating sensors using laminating process described in Example 2 above. Printed pressure sensing film where the printed zone was printed as a discontinuous region could be trimmed around that region such that a upon lamination, the printed zone was completely sequestered and seal from the external environment. Sensing films that were formed by flood coating were required to be trimmed to sizes smaller then the supporting laminating layers such that they would be hermetically sealed from the external environment.

Example 5

Pressure Indicating Sensors Produced Using Clear Over Coated Layers

Pressure indicating inks were prepared and printed according to Example 3 and 4 above. Printed sensors were prepared on 0.04 inch thick polystyrene substrate layers. Printed patterned samples were further over coated on the ink bearing side of a printed sheet. UV clear coat screen printing ink resins were utilized as the over coating composition. Clear coat UV curable resins from Nazdar Corporation (3200 series Clear Coat) were screen printed in a semi-thick layer using a 190 mesh screen. Printed/coated sample were cured by exposure to a medium pressure mercury vapor UV curing lamp system.

Printed/over coated samples were inspected to ensure that the pressure sensitive ink patterned regions were hermetically sealed beneath the UV clear coat. The backside of the printed sheet was finished by applying a double sided pressure sensitive adhesive backing. The sheet was die cut between each printed region to yield individual pressure indicating sensors.

Example 6

Heat Laminated Pressure Sensor with Colored Reference Mark

A heat laminated pressure sensor configuration was prepared in a manner similar to Example 2, 3 and Example 4 with the exception of using a heat laminating process rather than a pressure sensitive adhesive laminating process. High pressure Pressurex™ films were sized accordingly and marked with a pink/red marking pen. The marking pen was used to make a colored reference mark that represented the final color that the film was to achieve at a final pressure of 87,000 psi. The PMS ink color of the marking pen was applied at a color density that closely matched the pressure film's color response at the end point color change.

After the pressure film had been marked with the color matched marker, the device was assembled by placing a 0.25 inch square film piece between two heat laminating polyester films. The films selected were 0.07 inch thick each. A minimum border of 0.25 inch border of hermetic seal was maintained around each pressure sensing film piece. The border provided an important seal that prevented water from entering the device and coming in contact with the pressure sensing film layer. The heat laminating layers and sandwiched pressure sensitive film layers were processed using a standard roller based heat laminating system.

After laminating, an adhesive backing tape was adhered to the dye layer side of the laminating sandwich. Individual sensor devices were die cut from the finished laminating adhesive structure. Individual devices were successfully tested for pressure performance using a test pressure vessel described in Example 1. The color change indicated upon pressure exertion closely to the marking coloration. The marking coloration successfully served as a reference color that indicated the desired pressure setting to be measured.

Example 7

Pressure Sensor with Multiple Color/Level Reference Zone for Quantitative Pressure Indication Pressure indicating films were either procured as in Example 2 or prepared using Examples 3 and 4. 3 reference colors were determined experimentally and calibrated by printing densities and hues to correspond to the colors that the pressure sensing film progressively turns to during the pressure induced color transition/development process.

Pressure indicating films were cut into sections 0.2 inch wide and 0.6 inch in length. A pressure indicating film piece was place securely on a 0.04 inch thick piece of white polystyrene plastic. Thee color level/density reference colors were calibrated and printed using an inkjet of other conventional printing means. The reference color pieces equally measured 0.2 inch wide and 0.6 inch in length. Each color segment on a color reference piece covered one third of the piece. The lightest color corresponded to a pressure level that the indicating film would turn at 30,000 to 40,000 psi. Middle section color corresponded to the color that the indicating film would turn at 60,000 to 70,000 psi. The darkest color section at the end opposite of the lightest segment corresponded to the color that the indicating film would turn at pressures of 80,000 to 90,000 psi.

The color reference piece was abutted directly next to the indicating film section. Both pieces were aligned such that a color change that occurs on the indicating film would directly map onto the corresponding reference color. The reference color piece and the indicating film piece were hermetically laminated onto the bottom substrate using a clear adhesively coated 0.007 inch thick polyester top layer. Devices were completed with an adhesive backing as described in Examples 2, 3 and 4.

Example 8

Pressure Sensor Revealing Status Message

A bottom substrate piece 0.08 inch thick was engraved with the message "PASS" in a small font size. The engraving was centered on a 0.5 inch square at a depth of 0.02 inch deep. The engraved word was covered with a pressure indicating film with the pigment side facing the engraved surface. Devices were completed with a top layer and laminating adhesives as described in Examples 3 and 4. On use under high pressure, the word "PASS" would appear as white outlined lettering with a red background that had changed color in response to the pressure event. Pressure testing was accomplished using the test pressure vessel described in Example 1.

Example 9

Planar Laminate Enclosing Pressure Sensing Cavities

Cavities of various shapes, diameters, depths, and configurations were machine milled into a 0.125 inch piece of acrylic. Typical cavity sizes ranged from 0.125 inches in diameter to greater than 0.5 inches in diameter. By way of example but not limitation, sequential side-by-side hole sequences were milled adjacent to each other in diameters of 0.1 inch, 0.2 inch, 0.3 inch, 0.4 inch and 0.5 inch. Each hole was milled 0.08 inches deep. The holes were separated by 0.125 inches between each adjacent hole. Typical bottom substrate plastics should be strong, rigid and non-deformable. Useful non-deformable acrylic, rigid polycarbonate, and a variety of other structurally sturdy plastic resins and compounds.

Pressure sensing indicators were made by laminating deformable plastic layers over the cavities and hermetically sealing the upper laminating deformable plastic layer to the upper surface of the milled plastic bottom substrate layer. Strong water resistant double sided adhesives were used as described previously. Importantly, the sealed cavity provides a collapse region for the deformable plastic to conform to during a pressure testing event. The degree to which the upper laminating deformation layer compresses into the cavity can be calibrated to the uniform pressure in the pressure vessel or chamber.

Deformable laminating plastic layers can be selected based on thickness and composition in order to withstand or deform at specific pressure settings intended to be measured. Thicker more rigid plastic can withstand higher pressure settings and can be used to report or indicate high pressure events whereas thinner more deformable plastics find use for lower pressure measurements. Useful deformable laminating plastics include high impact polystyrene, soft polycarbonate, vinyl, polyvinyl chloride, polyethylene, ABS, polypropylene and the like.

Example 10

Thermoformed Pressure Indicating Sensor

Thermoformed collapsible pressure indicators were prepared using standard thermoforming molds, materials, and processes. A mold was machined in milled aluminum. Mold cavities were machined to specifications for molding a range for different thermoform designs. Straight walled holes with flat bottoms, holes with drafts ranging from 5% to 45%, conical holes, rounded holes for making hemispherical domes, holes with bottom radiuses and the like were machined. Depths ranged from 0.1 inch to 0.3 inches. For prototyping, multiple mold cavities and shapes we prepared on the same aluminum mold base.

Thermoforming was accomplished using standard thermoforming processes and materials. 0.01 to 0.08 plastic sheet stock including high impact polystyrene, soft polycarbonate, vinyl, polyvinyl chloride, polyethylene, ABS, polypropylene and the like were used for molding. Thicker more rigid plastic can withstand higher-pressure settings and can be used to report or indicate high-pressure events whereas thinner more deformable plastics find use for lower pressure measurements. The degree to which the molded structures compressed into the cavity can be calibrated to the uniform pressure in the pressure vessel or chamber. Opaque, semi-transparent, or clear molded plastic were used.

Plastic molded shapes commensurate with the mold designs above were prepared. Importantly each molded shape was prepared with a flat border around each shape such that each molded implement could be hermetically sealed in the planar direction perpendicular to the vertical direction of the molded shape. Collapsible pressure sensing indicators were prepared similarly to Examples 2 and 3 above. The double sided adhesive was first applied to a thicker pressure resistant the bottom substrate. Molded structures were laminated directly on the bottom adherent substrates such that air tight cavities were produced that protruded from the sensor surface. Care was taken to ensure that all surrounding seals were durable and hermetically sealed.

The thinner plastics using shapes designed with less structural integrity corresponded to a pressure level that the indicating film would turn at 30,000 to 40,000 psi. Middle section thickness shapes and structural designs corresponded to pressures in the range of 60,000 to 70,000 psi. The thickest most structural strong features including domed and conical shapes corresponded pressures in the range of 80,000 to 90,000 psi. Devices were completed with an adhesive backing as described in Examples 3 and 4.

Example 11

Injection Molded Relief Structure Pressure Indicating Sensor

Injection molded collapsible relief structure cavities were prepared using injection molding. Molded cavities were similar in size and shape compared with those in example 10. Importantly, structural features could be employed in the cavity design using injection molding that were difficult to achieve using the thermoforming process for making relief structures. Specifically, injection molding provides for the ability to adjust selective thickness of cavity walls at predetermined locations so that desired collapse sequences and final collapse configurations can be achieved. Thinner areas or features could be made to collapse at initially lower pressures whereas thicker or more structurally sound features could be designed to collapse or respond at higher pressures or later in the pressured event. Collapse profiles and sequences could be designed to achieve time/pressure dependent physical changes that provide both pressure and time-pressure profiles.

In general, thinner plastics using shapes designed with less structural integrity corresponded to a pressure level that the indicating film would turn at 30,000 to 40,000 psi. Middle section thickness shapes and structural designs corresponded to pressures in the range of 60,000 to 70,000 psi. The thickest most structural strong features including domed and conical shapes corresponded pressures in the range of 80,000 to 90,000 psi. Devices were completed with an adhesive backing as described in Examples 3 and 4. Pressure tests were accomplished using the test pressure vessel described in Example 1 above.

Example 12

Thermoformed Relief Structure Pressure Sensor Integrating an Optical Color Changing Pressure Indicating Film Thermoformed collapsible cavities and adherent bottom substrates were prepared according to Example 11 above. Pressure indicating color change films were prepared according to Examples 2 and 4 above. Pressure indicating films were secured on the adherent substrate such that the open side of a thermoformed cavity totally encompassed the film piece. The thermoformed cavity was adhered to the substrate such the pressure indicating film piece was completely sealed and positioned within the air tight collapsible cavity. Importantly, plastic stock materials for collapsible cavities were made with optically clear materials so that the pressure sensing film could be readily visualized.

Pressure tests were accomplished using the test pressure vessel described in Example 1 above. Color changes in the pressure sensitive film were observed and recorded only upon the structural collapse of the surrounding molded cavity. Films were used for measurement that either matched the collapse pressure of a given cavity or were offset above or below in pressure from the pressure required for the cavity to collapse.

Example 13

Stress Embossed Plastic Relief Structure Pressure Indicating Sensors

Stress embossed adhesive plastic films similar to those used in plastic labelers and embossed plastics like those used for credit cards (e.g. vinyl, vinyl laminates, polystyrene, ABS, and the like) were used as relief structure pressure indicators. Wording symbols, numbers, designs, emblems, embossed images, line art or the like cold be embossed in compatible films ranging in thickness from 0.005 inches to 0.10 inches thick. The embossed structures were formed at angles and curvatures compatible with uniform pressure compression and/or collapse.

Adhesive backing was placed on the back side of the embossed structure such that the embossed information could be laminated or adhered to a bottom substrate surface. Pressure indicating sensors were prepared in laminating layers similar to those described in examples 2, 3, 4 and 10. Pressure tests were accomplished using the test pressure vessel described in Example 1 above.

Example 14

Multi-Parameter Indicating Pressure/Parameter Monitoring Sensors

Combination time/pressure indicating sensors were prepared and developed for use with high pressure and elevated temperature sterilization/pasteurization processes. The emerging need and on-going developments in the field and industry such as combination heat and pressure sterilization/pasteurization make it important to incorporate multi-parameter sensing into indicator devices. By way of example, but not limitation, multi-parameter sensors can be used to indicate simultaneously or sequentially pressure and temperature, pressure and time, pressure and humidity, pressure, and irradiation, pressure and chemicals present, pressure and radio wave frequencies, pressure and microwave frequencies and either 2 or more parameters simultaneously or sequentially.

Multi-parameter sensors can employ discrete sensing zones for each parameter, or incorporate chemistries and/or physical features that permit the monitoring of different parameters using the same sensing zone. Chemistries or features can be uniquely formulated, positioned, and designed to accommodate multiple sensing elements. For example, a thermochromic material can be used in combination with a pressure sensing encapsulated dye to measure both temperature and pressure. In another example, a pressure sensing dye can be used in combination with a hydrochromic dye to measure pressure and hydration or humidity. Alternatively, a pressure sensing relief structure or dye can be used in combination or adjacent to a gamma irradiation sensitive dye to measure both pressure and irradiation levels.

Example 15

Combination Pressure Indicating Dye Sensor and Temperature Sensor

An combination pressure and temperature indicator was prepared using a thermochromic material described above and pressure indicating films that were either procured as in Example 2 or prepared using Examples 3 and 4. 3 pressure reference colors were determined experimentally and calibrated by printing densities and hues to correspond to the colors that the pressure sensing film progressively turns to during the pressure induced color transition/development process.

Pressure indicating films were cut into sections 0.2 inch wide and 0.6 inch in length. A pressure indicating film piece was place securely on a 0.04 inch thick piece of white polystyrene plastic. Thee color level/density reference colors were calibrated and printed using an inkjet of other conventional printing means. The reference color pieces equally measured 0.2 inch wide and 0.6 inch in length. Each color segment on a color reference piece covered one third of the piece. The lightest color corresponded to a pressure level that the indicating film would turn at 30,000 to 40,000 psi. Middle section color corresponded to the color that the indicating film would turn at 60,000 to 70,000 psi. The darkest color section at the end opposite of the lightest segment corresponded to the color that the indicating film would turn at pressures of 80,000 to 90,000 psi.

Similarly, the thermochromic indicator was placed adjacent to the parallel strip pieces of reference colors and pressure sensitive film pieces. An irreversible polydiacetylenic temperature indicator was used as the temperature indicating means. The temperature setting for the polydiacetylene was set using an appropriate temperature transitioning monomer chain length and ultraviolet irradiation levels at 254 nanometers. Devices were laminated and completed according to production steps illustrated in Examples 2, 3, and 4. Devices were tested in a pressure test vessel describe in Example 1 while being subjected to various external equilibrated temperature levels. Both the pressure sensing film layer and thermochromic indicating zone changed color at the respective pressures and temperatures.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

The invention claimed is:

1. A pressure sensor for visually determining whether a particular pressure has been reached, the sensor comprising:
   a) a substrate having a planar surface;
   b) a pressure sensitive optical change layer present on said planar surface, said pressure sensitive optical change layer comprising a dye that undergoes an optical change reaction from a first optical state indicating that the particular pressure has not been reached to a second optical state indicating that the particular pressure has been reached; and
   c) an optically transparent layer positioned on top of said pressure sensitive optical change layer and configured to seal said pressure sensitive optical change layer from the external environment of said sensor
   wherein when the particular pressure has been reached said pressure sensitive optical change layer changes from said first optical state to said second optical state, and
   wherein said optically transparent layer acts as a visible means for viewing the optical change reaction that occurs as a result of the pressure sensor being subjected to the particular pressure.

2. The sensor according to claim 1, wherein said pressure sensitive layer comprises two or more sub-layers.

3. The sensor according to claim 1, wherein said pressure sensitive layer is a film.

4. The sensor according to claim 1, wherein said sensor remains stable when exposed to a uniform pressure vector environment.

5. The sensor according to claim 4, wherein said pressure environment is a liquid pressure environment.

6. The sensor according to claim 4, wherein said pressure environment is a gaseous pressure environment.

7. The sensor according to claim 4, wherein said pressure environment is a solid pressure environment.

8. The sensor according to claim 1, wherein said pressure sensitive optical change layer changes color under pressure.

9. The sensor according to claim 1, wherein said sensor further comprises a reference element.

10. The sensor according to claim 1, wherein said sensor further comprises at least one additional sensor.

11. The sensor according to claim 10, wherein said at least one additional sensor is a temperature sensor.

12. A method of determining whether an article has been subjected to a predetermined pressure, said method comprising:
   providing said article, wherein said article is associated with a sensor according to claim 1; and
   evaluating said sensor to determine whether said article has been subjected to said predetermined pressure.

13. The method according to claim 12, wherein said evaluating comprises obtaining an optical signal from said sensor.

14. The method according to claim 13, wherein said signal is qualitative.

15. The method according to claim 13, wherein said signal is quantitative.

16. A pressure sensor for visually determining whether a particular pressure has been reached, the sensor comprising:
   a) a compliant medium; and
   b) a pressure sensitive relief structure surrounding the compliant medium, said pressure sensitive relief structure capable of undergoing a conformational change from a first conformation indicating that the particular pressure has not been reached to a second conformation indicating that the particular pressure has been reached,
   wherein when the particular pressure has been reached said pressure sensitive relief structure changes from said first conformation to said second conformation in a predetermined manner at the predetermined pressure.

17. The sensor according to claim 16, wherein said relief structure comprises a thermoformed cavity.

18. The sensor according to claim 16, wherein said sensor further comprises an pressure sensitive optical change layer comprising a dye that undergoes an optical change reaction from a first optical state indicating that the particular pressure has not been reached to a second optical state indicating that the particular pressure has been reached.

19. A method of determining whether an article has been subjected to a predetermined pressure, said method comprising:
   providing said article, wherein said article is associated with a sensor according to claim 18; and
   evaluating said sensor to determine whether said article has been subjected to said predetermined pressure.

20. The method according to claim 19, wherein said evaluating comprises obtaining an optical signal from said sensor.

21. The method according to claim 20, wherein said signal is qualitative.

22. The method according to claim 20, wherein said signal is quantitative.

23. The sensor according to claim 16, wherein said sensor further comprises a reference element.

24. The sensor according to claim 16, wherein said sensor further comprises at least one additional sensor.

25. The sensor according to claim 24, wherein said at least one additional sensor is a temperature sensor.

* * * * *